Aug. 4, 1931.  O. V. KARLSSON  1,817,516
MICROMETER CONSTRUCTION
Filed Jan. 3, 1927
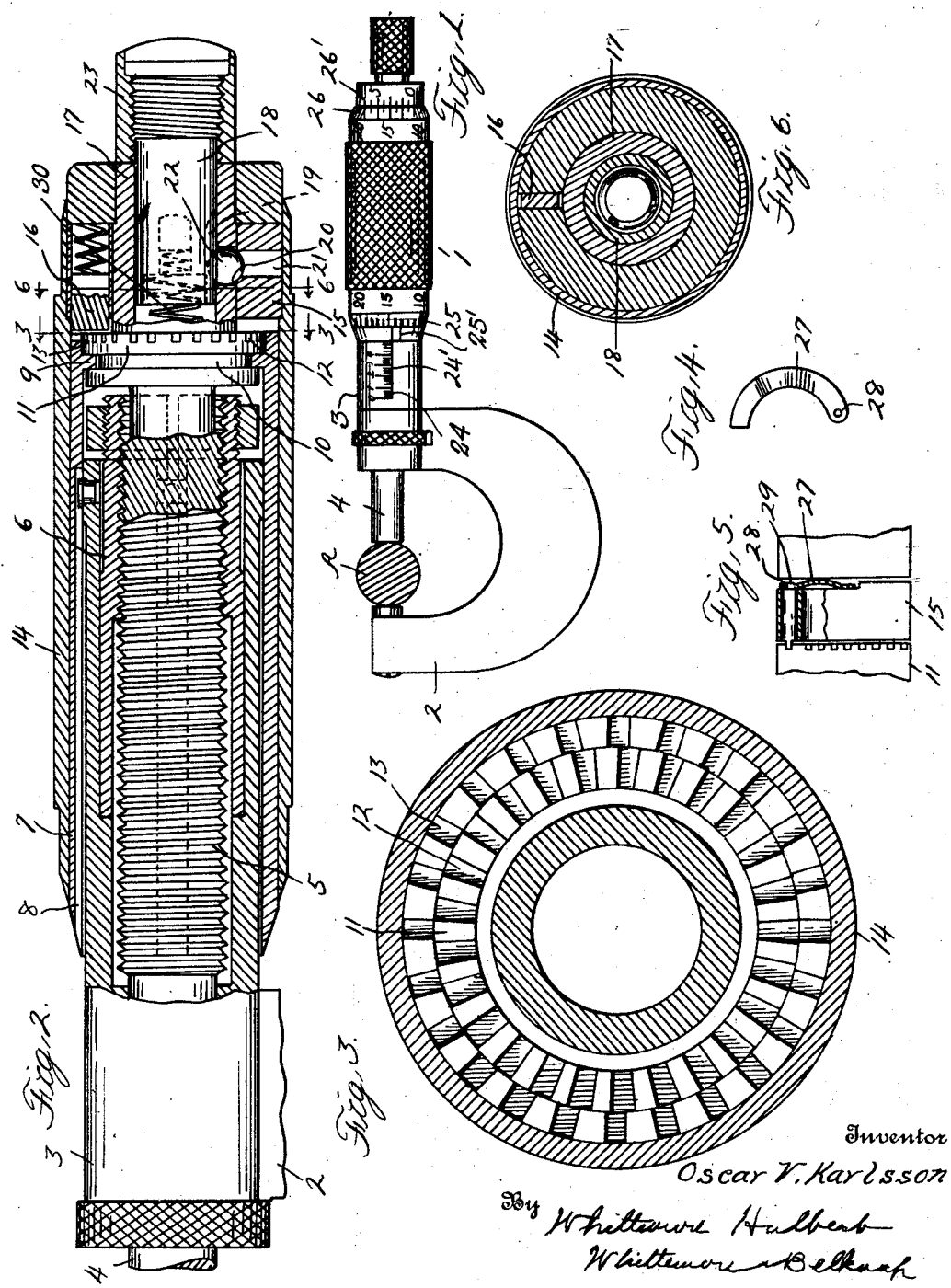
Inventor
Oscar V. Karlsson Patented Aug. 4, 1931

1,817,516

UNITED STATES PATENT OFFICE

OSCAR V. KARLSSON, OF DETROIT, MICHIGAN

MICROMETER CONSTRUCTION

Application filed January 3, 1927. Serial No. 158,756.

This invention relates generally to micrometers and refers more particularly to one wherein a fine vernier adjustment may be obtained. An object of the present invention is to provide a micrometer having means for accurately reading fractional parts of a thousandth of an inch. Another object is to provide a micrometer in which such a reading may be quickly obtained by simple and easy adjustment of the micrometer.

Further objects of the invention reside in the novel features of construction and combinations and arrangements of parts as more fully hereinafter set forth.

In the accompanying drawings:

Figure 1 is a side elevation of a micrometer constructed in accordance with the present invention;

Figure 2 is a longitudinal sectional view thereof;

Figure 3 is a section on line 3—3 of Figure 2;

Figure 4 is a detail of a flat spring for holding the dogging member in place;

Figure 5 is a modified form of the dogging means. Figure 6 is a section taken on the line 6—6 of Figure 2.

In the accompanying drawings wherein 1 generally designates a micrometer made in accordance with the present invention, the number 2 indicates a yoke, 3 a housing integrally connected thereto and 4 a spindle provided with a screw threaded intermediate portion 5 positioned within the housing. As shown a nut 6 is secured in the housing for engaging the screw 5 and allowing movement of the spindle for cooperating with the yoke 2 in the usual manner.

Surrounding the housing 3 is a sleeve 7 which is splined thereto as at 8, so as to be capable of longitudinal movement only. As shown this sleeve is provided adjacent one end thereof with an internal annular flange 9 which is adapted to engage an annular groove 10 provided in the periphery of an enlarged head 11 of the spindle 4. One face of the head 11 is adapted to lie flush with an end portion of the sleeve 7 and is provided with a series of notches 12. As shown the end portion of the sleeve is also provided with a series of notches 13 surrounding the notches 12 and so arranged as to total one less in number than the notches 12 of the head.

Surrounding the inner sleeve 7 is an outer sleeve 14 constituting a rotatable operating member which is provided at one end thereof with an internal collar 15 having mounted therein a spring pressed dog 16 adapted to slide over the notched portions 12 and 13 of the sleeve and head for a purpose hereinafter described.

Extending from the head 11 and axially arranged with respect to the remainder of the spindle 4 is a tubular end portion 17 supporting the collar 15. As shown a locking member 18 is adapted to be mounted within the tubular portion 17 and is provided with a segmental recess 19 cooperating with recessed portions 20 and 21 in the collar and tubular portion respectively for housing a ball 22.

The end portion of the locking member 18 is screw threaded to receive a knob 23 which when rotated in one direction operates to move the member 18 outwardly and force the ball into engagement with the recessed portions 20 and 21 to clutch the spindle 4 and sleeve 14 together. When the knob is rotated in the opposite direction, the locking member is moved inwardly so as to bring the largest portion of the segmental recess into alignment with the recessed portions 20 and 21 and thereby unclutch the sleeve 14 from the spindle 4.

It should be stated that the arrangement of the parts are such that the ball 22 will always engage the slot 19 to such an extent as to prevent rotation of the member 18. The ball will permit a limited sliding movement of the member 18 in the end portion 17, this movement being determined by the length of the slot 19. Thus when the knob 23 is rotated upon the member 18, a sliding movement of this member is effected. In Figure 2 the member is shown as being moved to the right as far as possible, the ball preventing any further movement in that direction. The knob in this position has of course been screwed upon the member as far as possible and is prevented from being unscrewed by giving the same an extra turn when it engages the end of the portion 17, this being sufficient to lock the parts in clutched position.

When the parts are unclutched and the recess 21 has been moved out of register with the recess 20 upon rotation of the sleeve 14 and the collar 15 the ball will be forced into the enlarged central portion of the recess 19 and will function to retain the member 18 in its inwardly extended position.

The housing 3 is provided with the usual linear calibrations 24 and the sleeve 14 with the fractional markings 25 which are adapted to give calculations down to the thousandth of an inch. Upon the other end of the sleeve are other calibrations 26 cooperating with markings 26' upon an end portion of the spindle to also give the fractional readings the same as the calibrations 25 when the parts are clutched. The markings 25 and 26 are also designed to give measurements down to the fractions of a thousandth of an inch and in the present case are calibrated to give readings down to one-twentieth-fifth of a thousandth.

In operation, assuming that a piece of material A is to be measured, the sleeve 14 is rotated in the usual manner for obtaining the ordinary readings down to a thousandth of an inch. During this adjustment the spindle 4 because of being clutched to the sleeve 14 will, of course, rotate therewith. However, the inner sleeve 7 because of being splined to the housing 3 cannot rotate, but as it is secured to the head 11 it will travel longitudinally of the housing with the spindle and will give the linear measurements, which, in the present instance, is denoted as .500. As will be noted, the longitudinal line of the markings 24' upon the housing is extended to the sleeve 7 so that the correct fractional measurements may be easily read from the calibrations 25, the reading in the present instance indicating .002+.500=.502. The reading of .002 is obtained by reading the number of points from 0 on the markings 25, 26 or 26 to the longitudinal 24'. Figure 1 shows the position of the parts after the sleeve 14 has been unclutched so that the calibrations 26' would be the only ones to give the reading of the thousandth of an inch. Before the parts are unclutched however, the zero marking of the calibrations 25 will also be in alignment with the zero marking of the calibrations 26' both of which will be two and a fraction points from the line 24', the 2 indicating the thousandths of an inch, the remainder indicating the fractional part of a thousandth which is still to be determined.

If it is now desired to obtain a fine vernier reading down to a fraction of a thousandth of an inch, the sleeve 14 is then unclutched from the spindle 4 by turning the knob 23 and moving the locking member 18 inwardly so as to allow the ball to enter the segmental recess 19. As stated aforesaid, the notches in the head 7 are designed to exceed by one the number of notches in the sleeve 7 and the members are so arranged that only one notch of the sleeve will register with the notch of the head. It will therefore be apparent that during the ordinary operation of the micrometer the dog 16 will rotate with the sleeve 14 and spindle 5 and will therefore slide over the notches in the sleeve 7. Likewise when the sleeve 14 is unclutched from the spindle 4 and is then rotated it will also move the dog 16 over the series of notches 12 and 13 until it reaches the point where the notches of each series are in register, whereupon further movement is arrested by the engagement of the said dog with the aligned notches.

It should be stated at this point that a line 25' on the sleeve 7 is spaced exactly one-twenty-fifth of a thousandth of an inch from the line 24', the arrangement being such that the marking of the calibrations 25 which is between these two lines when the sleeve 14 is arrested, will indicate the fraction of a thousandth of an inch. In Figure 1 the parts are shown in the final position of adjustment and the sleeve 14 after being unclutched has been rotated as far as possible with the fourteenth marking of the calibrations 25, being positioned between the lines 24' and 25', thus indicating that the additional fraction is fourteen-twenty-fifths of a thousandth of an inch, the final reading being .502+.001×14/25.

It will be apparent that as soon as the sleeve 14 and spindle 4 are unclutched and the sleeve rotated the first readings of .502 will be destroyed. If, however, it should be desired to again ascertain these first readings, it will only be necessary to note which marking of the calibrations 25 is nearest the line 24'. Then take the corresponding marking on the calibrations 26 and read the markings back to the zero point of the calibrations 26'. In Figure 1 this is shown as being 2 and a fraction, the 2 indicating the .002 and the fraction being the parts of the thousandths of an inch, which of course has already been clearly indicated.

In the present invention there are provided 24 notches on the sleeve and 25 on the head and the size of the parts are so constructed as to indicate one-twenty-fifth of a thousandth of an inch. However, the micrometer may be constructed so as to give any fraction which may be found convenient for the work to be measured. It should be explained that the readings may also be obtained with the parts initially unclutched. By having the member constantly urged outwardly by means of the spring 30, the ball 22 will be retained in the position shown in Figure 2 and hold the parts 17 and 15 together during the rotation of the sleeve 14 until the end of the spindle 4 engages the work A. At this point the readings down to the thousandth of an inch will be indicated as explained above. Any further movement of the spindle is impossible so that when the sleeve 14 is again rotated the ball 22 will be forced inwardly and permit relative movement between the parts 15 and 17. The sleeve 14 will continue to rotate by itself until the dog 16 engages in the aligned notches, whereupon the final reading can be ascertained by determining the number of the markings 25 between the lines 24' and 25'.

Figure 4 shows a modification in which a substantially flat spring 27 is used in place of the coil spring shown in Figure 2 for forcing the dog 16 against the notches. In this arrangement the collar 15 is provided with a cut-away portion on its outer face to allow for the insertion of the flat spring. As shown this spring is provided at one end thereof with an aperture 28 for engaging a projection 29 on the dog 16. When the sleeve and spindle are unclutched the operation is the same as usual except that the collar 15 is moved by the flat spring, carrying with it the dog 16 for engaging the notches.

From the foregoing it will be apparent that I have provided a micrometer with means for not only giving the usual measurements, but have incorporated therein the additional feature of providing means for indicating readings down to the fractions of a thousandth of an inch.

While it is believed that from the foregoing description the nature and advantages of my invention is readily understood, I desire to have it understood that I do not limit myself to the specific construction shown and described and that such changes may be resorted to when desired as fall within the scope of the claims.

What I claim as my invention is:

1. In a micrometer, the combination of a housing, a spindle movable within said housing, an outer sleeve surrounding said housing and normally clutched to the spindle for adjusting the same, a head on said spindle provided with a series of notches, an inner sleeve mounted on said housing within said outer sleeve and movably connected to said head and provided with a series of notches surrounding the notches of said head means for normally clutching said outer sleeve and spindle, and means carried by said outer sleeve and adapted to slide over said notches for obtaining a vernier reading when the said outer sleeve and spindle are unclutched.

2. In a micrometer, the combination of a housing, a spindle movable within said housing, an outer sleeve surrounding said housing and normally clutched to the spindle for adjusting the same, a grooved head on said spindle having a groove therein and provided with a series of notches, an inner sleeve mounted within said outer sleeve and splined to said housing for longitudinal movement only, said sleeve being provided with a flange seating in said groove and having an end portion provided with a series of notches surrounding the notches of said head, means for normally clutching said outer sleeve and spindle, and a dog carried by said outer sleeve and adapted to slide over said notches when the said sleeve and spindle are unclutched for obtaining a vernier reading.

3. In a micrometer, the combination with a housing, a spindle movable within said housing, an outer sleeve surrounding said housing and normally clutched to the spindle for adjusting the same, a head on said spindle provided with a series of notches, an inner sleeve mounted on said housing within said outer sleeve and movably connected to said head and provided with a series of notches surrounding the notches of said head and so arranged as to have one notch thereof in register with one of the notches of said head, means for normally clutching said outer sleeve and spindle, and a dog carried by said outer sleeve and adapted to slide over said notches for engaging said aligned notches when the said outer sleeve and spindle are unclutched for obtaining a vernier reading.

4. In a micrometer, the combination of a housing having linear calibrations, a spindle movable within said housing relative thereto and having calibrations thereon, a sleeve surrounding said housing and normally clutched to said spindle and movable therewith and provided with circumferential calibrations and means for normally clutching said spindle and sleeve, the calibrations on said sleeve being adapted to designate certain measurements when the sleeve is clutched to the spindle, said calibrations being adapted to indicate other measurements when the said parts are unclutched.

5. In a micrometer, the combination of a housing having linear calibrations, a spindle movable within said housing relative thereto and having calibrations thereon, a sleeve surrounding said housing and normally clutched to said spindle and movable therewith and provided with circumferential calibrations on each end thereof and means for normally clutching said spindle and sleeve, the calibrations on one end of said sleeve being adapted to cooperate with the linear calibrations on the said housing for indicating certain fractional measurements when the said sleeve and spindle are clutched and to indicate a vernier reading when said parts are unclutched, the calibrations on the other end of said sleeve being adapted to cooperate with the calibrations on the spindle head for indicating both the aforesaid fractional measurements and also a vernier reading when the said parts are unclutched.

6. In a micrometer, the combination of a housing having linear calibrations, a spindle movable within said housing relative thereto and provided with an enlarged end portion having circumferential calibrations thereon, an inner sleeve mounted on said housing for longitudinal movement only and being adapted to cooperate therewith to indicate the linear measurements and being provided with markings thereon, and an outer rotatable sleeve surrounding said inner sleeve normally clutched to said spindle and provided with circumferential calibrations on each end thereof and means for normally clutching said spindle and outer sleeve, the calibrations on one end of said outer sleeve being adapted to cooperate with the markings on the inner sleeve for indicating certain fractional measurements when the said sleeve and spindle are clutched and to indicate a vernier reading when the parts are unclutched, and the calibrations on the other end of said outer sleeve being adapted to cooperate with the calibrations on the spindle head for indicating both the aforesaid fractional measurements and also a vernier reading when the said parts are unclutched.

7. In a micrometer, the combination of a housing, a screw in threaded engagement therewith having an enlarged head provided with a series of notches, a member non-rotatable with respect to said housing and having a series of notches in vernier relationship with said first mentioned notches, a second member rotatable with respect to said housing, and a dog carried by said last mentioned member and slidable over said notches for obtaining a vernier reading of said micrometer.

8. In a micrometer, the combination of a housing, a screw in threaded engagement therewith having a head provided with a series of notches, a member non-rotatable with respect to said housing and having an end portion provided with a series of notches located adjacent said first mentioned notches, a second member rotatable with respect to said housing, and a dog carried by said rotatable member and slidable over said notches for obtaining a vernier reading of said micrometer.

9. In a micrometer, the combination of a housing, a screw in threaded engagement with said housing and having a head provided with a series of notches, a sleeve non-rotatable with respect to said housing and surrounding said screw and housing provided at one end thereof with a series of notches surrounding said first mentioned notches in vernier relationship therewith, a second sleeve rotatable with respect to said housing and surrounding said non-rotatable sleeve, and a dog carried by said rotatable sleeve and slidable over said notches for obtaining a vernier reading of said micrometer.

10. In a micrometer, the combination of a housing, a screw in threaded engagement with said housing and having a head provided with a series of notches, a sleeve non-rotatable with respect to said housing and surrounding said screw and housing and provided at one end thereof with a series of notches surrounding said first mentioned notches in vernier relationship therewith and so arranged as to have one notch thereof in register with one of the notches of said head, a second sleeve rotatable with respect to said housing and surrounding said non-rotatable sleeve, and a spring-pressed dog carried by said rotatable sleeve adapted to slide over said notches for engaging said aligned notches to obtain a vernier reading of said micrometer.

11. In a micrometer, the combination of a housing, a spindle movable within said housing, a sleeve surrounding said housing, means for normally clutching said sleeve and spindle whereby the same may be adjusted to obtain certain fractional measurements, and means for obtaining a vernier reading of the micrometer while the spindle is held stationary when the said sleeve and spindle are unclutched.

12. In a micrometer, the combination of a housing, a spindle movable within said housing, means normally clutched to said spindle for adjusting the same, means for clutching said first mentioned means to said spindle, and means for obtaining a vernier reading of the micrometer while said spindle is held stationary when said spindle and first mentioned means are unclutched.

13. In a micrometer, the combination with a housing, of a movable spindle carried thereby, a sleeve carried by the housing and movable relative thereto, means for clutching said sleeve and spindle whereby the same may be adjusted to obtain certain fractional measurements and means for obtaining a vernier reading on the micrometer without further adjustment of the spindle.

14. In a micrometer, the combination with a housing having linear calibrations, of means movable within said housing and having circumferential calibrations thereon, means mounted on said housing for movement longitudinally thereof and adapted to cooperate with said housing to indicate linear measurements and provided with markings, and means associated with said last-mentioned means clutched to said first-mentioned means and provided with calibrations, and means for normally clutching said first and last-mentioned means, certain of the calibrations on said last-mentioned means being adapted to cooperate with the markings on the second-mentioned means for indicating certain fractional measurements when the said second-mentioned means and first-mentioned means are clutched and to indicate a vernier reading when the parts are unclutched, and certain other calibrations on the said last-mentioned means being adapted to cooperate with the calibrations on the first-mentioned means for indicating both the aforesaid fractional measurements and also a vernier reading when the said parts are unclutched.

In testimony whereof I affix my signature.

OSCAR V. KARLSSON.